Dec. 18, 1962  E. E. LAKSO  3,068,623
ROTARY MACHINE FOR COUNTING AND FILLING TABLETS
Original Filed Feb. 4, 1960  2 Sheets-Sheet 1
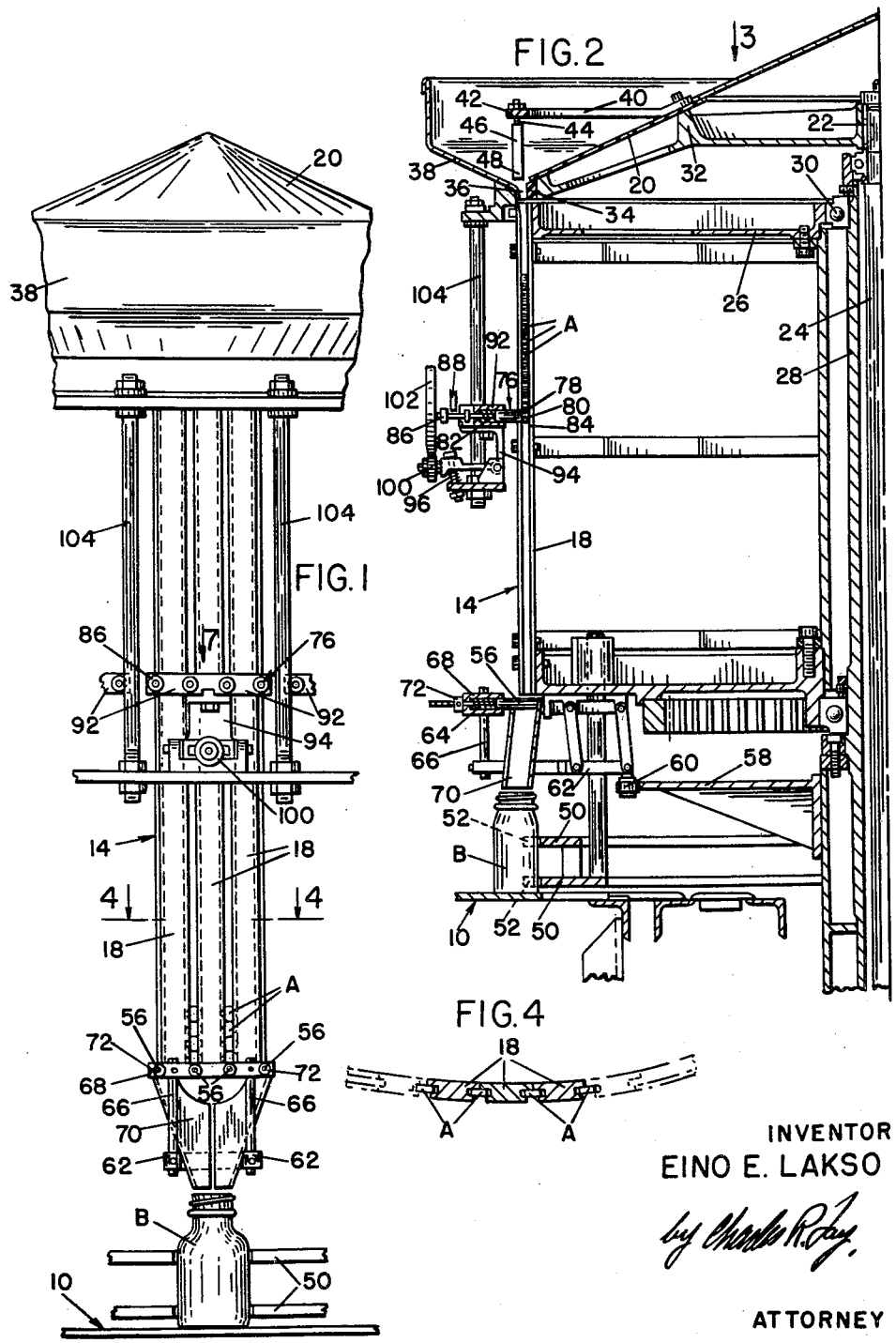
INVENTOR
EINO E. LAKSO
ATTORNEY

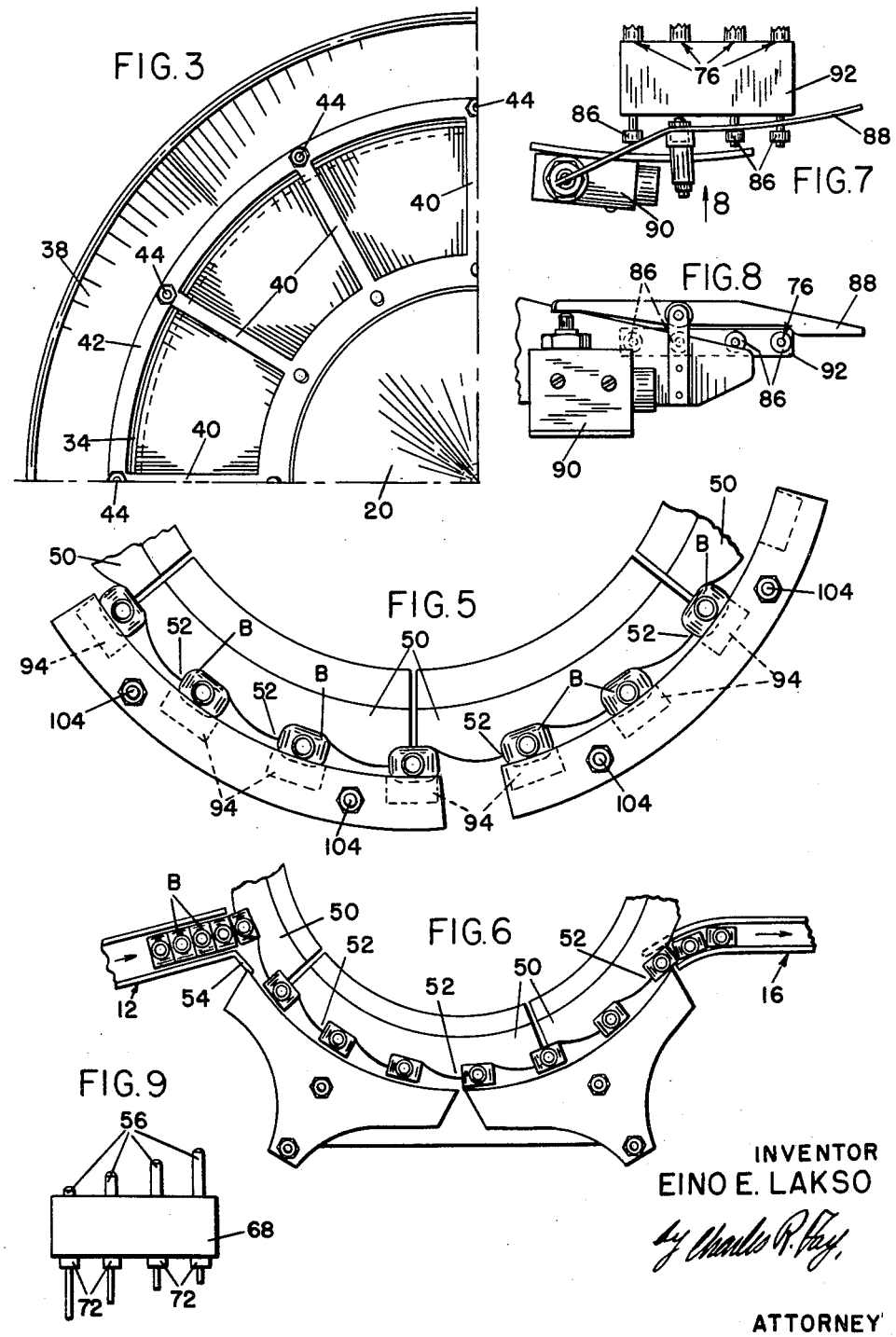

United States Patent Office 3,068,623
Patented Dec. 18, 1962

3,068,623
ROTARY MACHINE FOR COUNTING AND
FILLING TABLETS
Eino E. Lakso, Fitchburg, Mass., assignor to The Lakso Company Incorporated, Fitchburg, Mass., a corporation of Massachusetts
Original application Feb. 4, 1960, Ser. No. 6,663. Divided and this application Mar. 23, 1962, Ser. No. 182,025
2 Claims. (Cl. 53—52)

This application is a division of my prior application Serial No. 6,663 filed February 4, 1960 and relates to a new and improved rotary machine for counting and filling articles such as tablets, etc. into containers, and the principal object of the invention resides in the provision of a machine for speeding up the operations and also to render the same more even and uniform in the actuation thereof, with less breakage and "starving" of the chutes or runways through which the articles travel.

This invention represents in general an improvement over my copending application Serial No. 696,527 filed November 14, 1957.

One of the principal objects of the present invention resides in the provision of special new and improved means for making the articles to be counted and filled run more easily and uniformly downwardly into special new and improved channels or chutes provided on the turret for the purpose, said channels or chutes leading to containers which are continuously moved past but with the rotating turret, the containers each receiving a predetermined number of articles from said channels; and the provision of means for intermittently stopping the progress of the articles down the chutes, thereby making a predetermined number of articles in each chute; and the provision of special new and improved means for feeding a plurality of chutes into a single container in a continuous operation during the rotation of the machine, whereby each container is provided, for instance, with a hundred articles receiving twenty-five seriatum from a series of four chutes, these figures being by way of example only.

Further objects of the invention include the provision of a new and improved stop motion by which the entire machine is automatically stopped upon a feeler finger extending into a chute without finding an object or article in the chute in the position where it should be, and including a link or similar device under control of said feeler finger, which device operates a switch for shutting off the entire machine, so that the operator may quickly and easily find the particular chute which is malfunctioning and clear the same for continued operation.

Other objects and advantages of the invention will appear hereinafter.

Reference is to be had to the accompanying drawings, in which

FIG. 1 is a fragmentary view in front elevation illustrating a unit of the machine forming the invention, certain parts and sections being omitted for the sake of clarity;

FIG. 2 is a vertical section through the machine illustrating the mechanism;

FIG. 3 is a top plan view of the turret on an enlarged scale especially showing the hopper;

FIG. 4 is a section on line 4—4 of FIG. 1;

FIG. 5 is a partial plan view showing the progress of the containers;

FIG. 6 is a partial plan view showing the path of the containers relative to the turret;

FIG. 7 is a plan view on an enlarged scale showing the stop motion device;

FIG. 8 is a front view thereof; and

FIG. 9 is a plan view showing the variation of position of the stop fingers.

In carrying out the present invention, the same is mounted upon any kind of base or framework desired and generally indicated by the reference numeral 10. In general, there is a conveyor 12 leading containers to the turret 14 and a conveyor 16 which is an out-feed conveyor for the filled containers, see FIG. 6.

On the turret there are arranged a series of vertical chutes 18, these chutes forming guideways for the articles A which travel down the same under the force of gravity. These chutes are arranged on a surface of revolution as a cylinder, although they may be mounted in series for the purpose of removing the same and substituting chutes having different cross-sections for articles of different sizes.

The top of the machine forms a hopper and the floor of the hopper is indicated as at 20. This is a conical member having a very wide base and at its center it is keyed at 22 to a vertical shaft 24, this shaft 24 having an oscillatory action derived from a motive power in the base of the machine. The shaft 24 is appropriately journaled and the turret itself which is generally indicated at 26 in FIG. 2, is also appropriately journaled as for instance on a vertical sleeve 28 surrounding shaft 24 on bearings 30, so that the shaft 24 can oscillate with relation to the sleeve 28 and the turret 26 can continuously rotate uni-directionally.

At its periphery the floor 20 which is mounted on a suitable framework 32 is provided with a depending annular rubber ring or the like. This rubber ring has an exterior surface forming a wall of an annular trough or groove 36. The other wall of this trough is formed by the hopper wall 38 which is of more or less usual shape and construction and forms a barrier for the articles to be contained in the hopper as will be clear. An agitating device for the articles is provided to aid in filling the trough and this might consist of a series of bars forming a spider-like member 40 on which is arranged an annular ring 42 directly above the groove 36. This ring 42 may be provided with spaced depending pins 44 upon each of which is mounted a flexible tip or finger 46. These fingers terminate at 48 closely adjacent the top of the trough 36.

It is to be observed that the present rotary machine has a relatively long filling range and a relatively short range of deposition of the articles in the bottles, see FIG. 6, the filling of the chutes taking place in the turret when it is not operating to fill the container somewhat in the same manner as described in my copending application above identified.

The containers B are moved along in a continuous arrangement by a toothed wheel which is indicated at 50, this wheel having spaced shoulders 52 which pick up individual containers B from an in-coming chute 54 arranged on the in-coming conveyor 12. These containers move with the turret, the feeding member 50 being secured to the turret and comprising a pair of vertically-spaced members, if desired, as best shown in FIG. 2, in order to smoothly carry the containers B along the prescribed course. Any kind of guides necessary may be utilized to maintain the arcuate path of these bottles during the filling operations thereof.

At the bottom of the chutes 18 there is provided a series of stop pins indicated at 56, these traveling around on the turret and each maintaining its relative position with respect thereto at all times. These pins are retractable by a shaped cam shown in section at 58 in FIG. 2. This cam is fixed and acts upon a cam follower 60 mounted on parallel bar linkage 62 on the turret. Each pin 56 is backed up by a spring 64 which normally maintains it in article stopping position as shown in FIG. 2. The pins are retracted intermittently by reason of the motion of the parallel bar linkage 62 which is connected to an upright 66 connected in turn to the bracket 68 containing the springs 64 and the pins 56. Of course when the pins are retracted by the parallel bar linkage moving radially outwardly relative to the turret, the articles in the chutes at 18 will necessarily fall into the respective containers B.

However, the containers are spaced from the lower ends of the chutes 18 by triangular or conical shaped chutes 70, so that as clearly shown in FIGS. 1 and 2 four chutes deliver all of the tablets into a single container, thus greatly increasing the speed of filling. In other words, the continuous filling operation takes place between the in-coming and the outgoing conveyors by having one chute discharge, and then another, and then the third, and then the fourth, and this is accomplished by providing each pin 56 with a stop collar adjustable thereon as indicated at 72. Thus as the bracket 68 is retracted, it first retracts a pin having its collar closest thereto, then a pin having a collar a little farther toward the rear or the left in FIG. 2, etc.

In order to accurately count the articles in the chutes, there is provided a cam-actuated stop finger for each chute, this being indicated generally at 76, FIGS. 2, 7 and 8. There is a finger or pin 76 for each chute and each finger or pin is provided with a leather or rubber tip 78 which actually enters the chute and contacts and stops an article as is clearly indicated in FIG. 2 at 80. Each finger 76 is provided with a spring 82 which tends to maintain it in its stopping position in FIG. 2, and it will be observed that if the article 80 is not in position, the tip 78 will extend to the rear wall of the chute at 84, thus bringing the entire finger slightly forwardly of the normal position shown in FIG. 2. Each finger is provided with a head 86 and when the above-described action takes place, a lever 88 normally in a down position (FIG. 2) will be caused to impinge upon head 86, i.e., will be caused to rise relative to its normal position, and this in turn will cause the actuation of a micro-switch or the like 90 to stop the machine.

The fingers 76 are carried around on the turret also because they are all mounted on brackets or the like, or a series of brackets 92. Brackets 92 are pivotally carried by bell-crank brackets 94 which are urged in a clockwise direction in FIG. 2 by springs 96. However, these brackets are retracted in series by means of a cam follower 100 acted upon by a fixed cam 102 which is arranged circumferentially of the turret in the correct position to release the articles 80 and those above for disposition in the lower portions of the chutes 18 where they are stopped by pins 56. At the correct timed relationship, however, the cam followers 100 ride off the cams 102 and the springs 96 bring the brackets 94 back into position where the fingers 76 once more engage and stop the articles 80, with the exception of the stop motion action described above.

The brackets and pins may be mounted from any part of the machine as on uprights 104, and this is preferred to be done in quadruples as shown in FIGS. 1 and 5, so that the chutes 18, 70, stop pins 56 and the counting fingers 76 are all mounted in units upon the framework 26 of the machine and can be removed and replaced easily.

Having thus described my invention and the advantages thereof, I do not wish to be limited to the details herein disclosed, otherwise than as set forth in the claims, but what I claim is:

1. An article counting and filling machine comprising a rotary turret, a series of open-ended upright article filling chutes, and a stop motion means provided for each filling chute, said stop motion means comprising a finger, a spring for said finger, the spring normally tending to move said finger transversely into a filling chute and to come to rest on an article in said filling chute or selectively in the absence of such article to move deeper into said chute and contact a back wall portion thereof, the finger having a head thereon at the opposite end, a feeler member, said feeler member having a motion generally parallel to the line of advancement of the articles in the chutes and transverse to said finger, and having a normal position contacting said finger but being arranged to contact said head when said finger is in its inwardmost position with respect to said chute so that the feeler member is then stopped in a position different from its normal position, and a switch actuated by said feeler member when said feeler is in said position against the head, said switch being adapted to cut off the action of the machine and stop the same when the position of the finger indicates the absence of articles in the chute 2. The machine of claim 1 including a pivoted support for the finger, means rocking said support to remove the finger from the chute periodically and intermittently, and means causing the supporting means to carry the finger back into article-probing position intermittently in timed relation to the filling and counting function of the machine.

References Cited in the file of this patent

UNITED STATES PATENTS

| | | |
|---|---|---|
| 2,585,558 | Lasko | Feb. 12, 1952 |
| 2,845,759 | Cote et al. | Aug. 5, 1958 |
| 3,028,713 | Kennedy et al. | Apr. 10, 1962 |